(12) United States Patent
Hulliger et al.

(10) Patent No.: US 8,852,478 B2
(45) Date of Patent: Oct. 7, 2014

(54) INJECTION MOLDING METHOD INCLUDING MACHINING OF BOTH INJECTION MOLD AND MOLDED PRODUCT

(75) Inventors: Urs Hulliger, Langendorf (CH); Hugo Flueckiger, Derendingen (CH)

(73) Assignee: Depuy Synthes Products, LLC, Raynham, MA (US)

( * ) Notice: Subject to any disclaimer, the term of this patent is extended or adjusted under 35 U.S.C. 154(b) by 213 days.

(21) Appl. No.: 13/197,576

(22) Filed: Aug. 3, 2011

(65) Prior Publication Data

US 2012/0292807 A1 Nov. 22, 2012

Related U.S. Application Data

(60) Provisional application No. 61/371,868, filed on Aug. 9, 2010.

(51) Int. Cl.
 *B29C 45/40* (2006.01)
 *B29C 33/00* (2006.01)
 *B29C 45/00* (2006.01)

(52) U.S. Cl.
 CPC ............. *B29C 33/00* (2013.01); *B29C 45/0055* (2013.01); *B29C 45/40* (2013.01); *B29C 2045/0058* (2013.01)
 USPC ............ 264/221; 264/162; 264/163; 264/317

(58) Field of Classification Search
 CPC .. B29C 33/448; B29C 33/54; B29C 45/4457; B29C 2045/0058
 USPC .................................. 264/162, 163, 221, 313
 See application file for complete search history.

(56) References Cited

U.S. PATENT DOCUMENTS

| | | | |
|---|---|---|---|
| 6,375,880 B1 * | 4/2002 | Cooper et al. ................ 264/138 |
| 6,564,852 B1 | 5/2003 | Wendt et al. |
| 8,033,805 B2 * | 10/2011 | Gubanich et al. ............... 425/78 |
| 2002/0070481 A1 | 6/2002 | Hernandez |
| 2002/0165634 A1 | 11/2002 | Skszek |

FOREIGN PATENT DOCUMENTS

| | | |
|---|---|---|
| EP | 1705954 | 9/2006 |
| EP | 1749596 | 2/2007 |
| JP | 4123838 | 4/1992 |
| JP | 2009-220274 | 10/2009 |

* cited by examiner

*Primary Examiner* — Christina Johnson
*Assistant Examiner* — David Schmerfeld
(74) *Attorney, Agent, or Firm* — Fay Kaplun & Marcin, LLP

(57) ABSTRACT

A method for manufacturing an injection molded product includes producing an injection mold by building a one-piece mold block including a mold cavity sized and shaped to correspond to a desired shape of the injection molded product and a first feeder duct extending from the mold cavity and injecting a molten material into the mold cavity via the feeder duct to form an injection molded product and a sprue extending therefrom into the first feeder duct in combination with machining a portion of the injection block to expose the injection molded product and machining the injection molded product while the sprue firmly holds the product in a remaining portion of the injection mold. The product is then cut from the sprue.

10 Claims, 4 Drawing Sheets

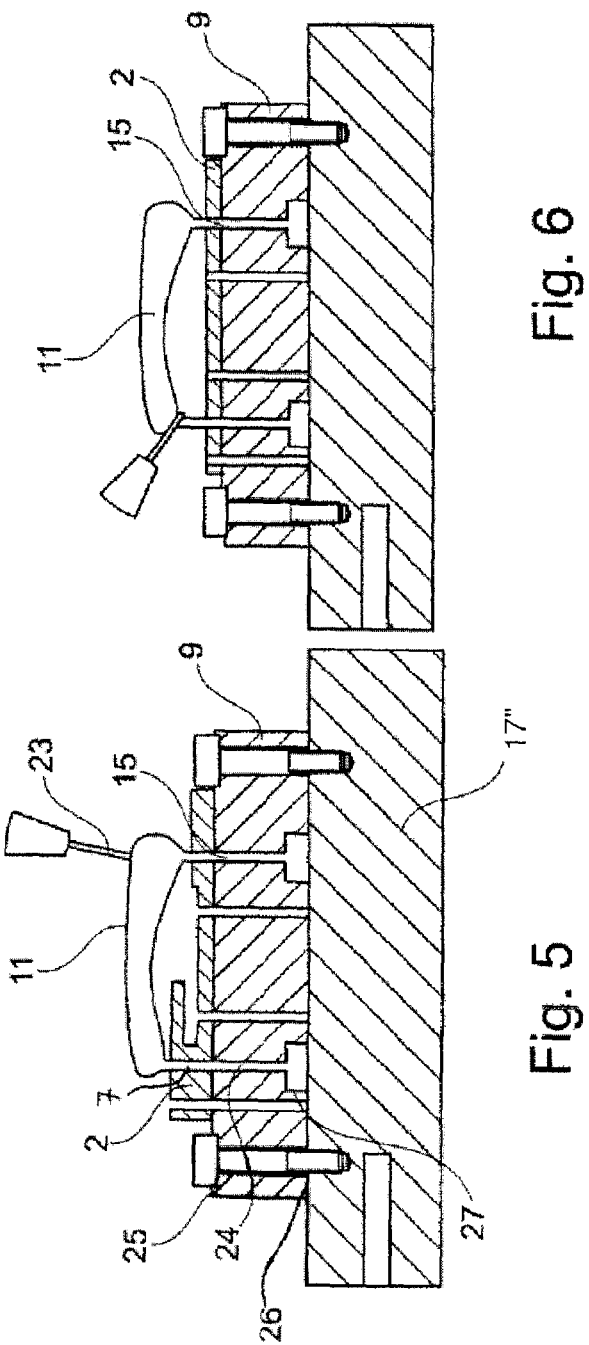

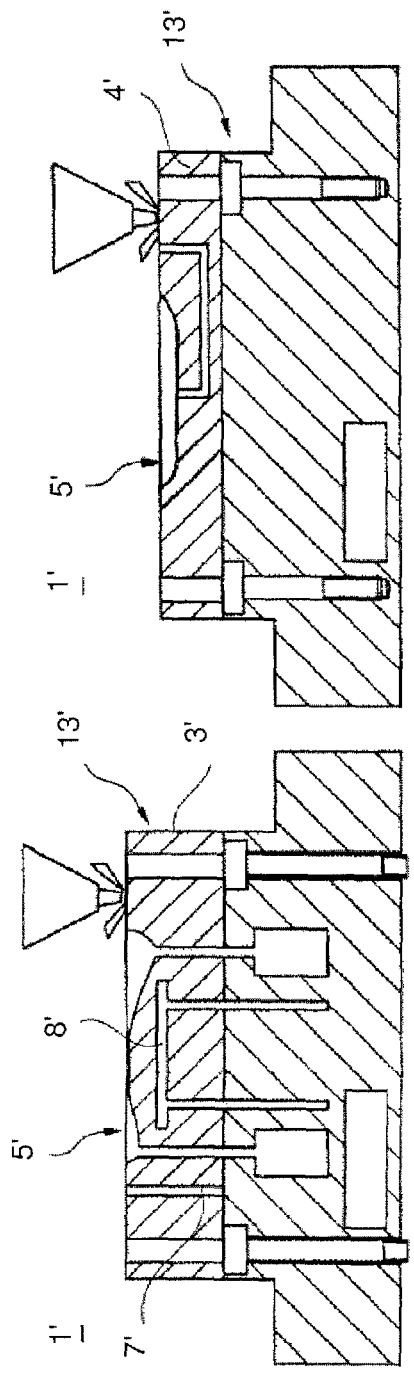
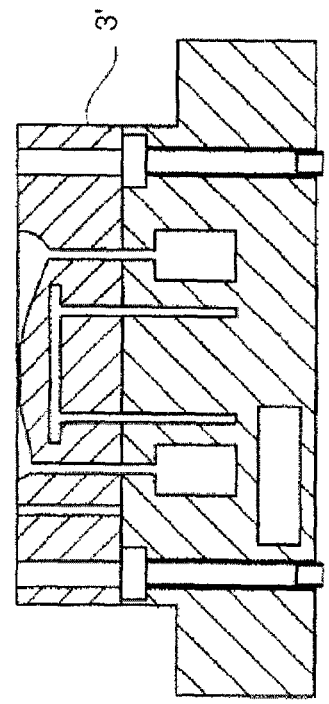
Fig. 8
Fig. 9
Fig. 10

INJECTION MOLDING METHOD INCLUDING MACHINING OF BOTH INJECTION MOLD AND MOLDED PRODUCT

PRIORITY INFORMATION

The present application claims priority to U.S. Provisional Application Ser. No. 61/371,868 entitled "Method for Manufacturing an Injection Molded Product" filed on Aug. 9, 2010 to Urs Hulliger and Hugo Flueckiger. The entire contents of this application are incorporated herein by reference thereto.

FIELD OF THE INVENTION

The present invention relates generally to a method for manufacturing a product by injection molding.

BACKGROUND

One problem associated with known injection molds is that usually a two part mold is configured in such a way that a product formed in the mold is not held in either part of the two part mold so that the product must be fixed to a machine by particular holding, gripping or fixation devices for further machining. Thus, there remains a need for an improved method for manufacturing a product by injection molding with an injection mold which permits machining or a removal of a portion of the injection mold so that the product is firmly held in the remaining part of the injection mold and can be further processed or machined without the need for additional holding, gripping or fixation devices.

SUMMARY OF THE INVENTION

The present invention relates to a method for manufacturing an injection-molded product. The exemplary method according to the invention comprises the steps of producing an injection mold by building up layer by layer a one-piece mold block including a mold cavity sized and shaped to correspond to a desired product to be formed by injection molding and injecting a molten material into the injection mold and cooling off the injected molten material so that an injection molded product is formed. The injection mold is machined after cooling off of the product to remove a portion of the injection mold necessary to completely expose the product. The product is then machined while being firmly held in a remaining part of the injection mold via one or more sprues extending therefrom. The product is then cut off from the one or more sprues.

Exemplary molding materials for the product according to the invention include PEEK, reinforced plastic and injectable metal alloys.

The method according to the exemplary embodiment of the present invention may speed production of individual products (e.g., implants) with the injection molding technique and may further permit an injection mold to be quickly produced for an individual product without the need for a pattern of the product to be molded. The method according to the invention may also allow the molded product to be machined (e.g. by milling) without the need for further holding, gripping or fixation devices and will make a two part mold unnecessary due to the configuration of the injection mold as a lost mold. Furthermore, injection and coolant ducts can be individually configured and the mold may be mounted on an interface plate suitable as a base for different machines.

In one exemplary embodiment, the machining of the product includes producing a smooth outer surface on the product by milling to permit use thereof as a medical implant. Holes and threads may be machined into the product as required for particular procedures. Furthermore, the exemplary milling system and method permits the productions of structures that are too coarse to be injection molded, as those skilled in the art will understand.

In a further exemplary embodiment of the method the injection mold may be produced such that it is fixedly built up on a base plate. This configuration has the advantage that the base plate may act as an interface for different machines (e.g., the injection molding machine, a milling machine, etc.).

In a further exemplary method, the production of the injection mold may include the production of one or more feeder ducts. Thus, the injection mold may be completely finished via layer-by-layer deposition so that no subsequent processing or machining is necessary.

In another exemplary method, the base plate comprises a first surface facing the injection mold, a second surface facing away from the injection mold and one or more inflow channels in fluid communication with the one or more feeder ducts. The inflow channels have an enlarged cross-section towards the second surface of the base plate. The enlarged cross-section permits the one or more sprues to be form-fittingly and rigidly gripped in the base plate so that the product can be rigidly held in the remaining part of the injection mold and the base plate. The inflow channels may have a cylindrical or conical portion.

In another exemplary method, the layer-by-layer deposition may be performed by "direct additive laser manufacturing", which requires depositing a laser melted metallic powder.

In yet another exemplary method, one or more metallic structures may be introduced into the injection mold during production of the injection mold. The metallic structure may provide an integrated support in the finished product to improve the mechanical stability of the product.

In still another exemplary method, one or more metallic inserts may be introduced into the injection mold during production of the injection mold. The metallic inserts may be firmly anchored within the product.

In a further exemplary method, the machining of the product may include milling of the product and/or cutting threads into the one or more metallic inserts.

In a further exemplary method, the production of the injection mold may include the production of one or more air and material outlets and one or more coolant ducts.

According to a further exemplary embodiment of the present invention, there is provided a method for manufacturing an injection molded product comprising the step of producing an injection mold in the form of a two part mold including a lower and an upper part forming a mold cavity therebetween configured to form a desired product by injection molding. A molten material is injected into the injection mold and cooled to form the desired product. The upper part of the two-part mold is removed after cooling of the product. The lower part of the injection mold is machined to remove a portion of the injection mold necessary to completely expose the product. The product is machined while being firmly held in a remaining part of the lower part of the injection mold via one or more sprues extending therefrom. The product is then cut from the one or more sprues.

In one exemplary method, the two-part mold is produced by a selective laser melting procedure.

In another exemplary embodiment, the machining of the product includes producing a smooth outer surface on the product by milling to permit use thereof as a medical implant. Furthermore, the exemplary milling system and method permits the productions of structures that are too coarse to be injection molded, as those skilled in the art will understand.

In another exemplary method, the injection mold may be fixedly built up on a base plate which can be used as an interface for different machines (e.g., the injection molding machine, a milling machine, etc.).

In another exemplary method, the production of the injection mold may include the production of one or more feeder ducts so that the injection mold can be completely finished via layer-by-layer deposition without requiring subsequent processing or machining.

In still another exemplary method, the base plate comprises a first surface adjacent to the injection mold, a second surface facing away from the injection mold and one or more inflow channels in fluid communication with the one or more feeder ducts. The inflow channels may have an enlarged cross-section toward the second surface so that the one or more sprues are form-fittingly and rididly gripped in the base plate. Further, any of the inflow channels may have a cylindrical or conical portion.

According to another exemplary embodiment of the present invention, there is provided a method for producing an injection mold comprising the step of building up layer-by-layer a one-piece mold block including a mold cavity for forming a desired product by injection molding, one or more feeder ducts, an air outlet and one or more coolant ducts.

BRIEF DESCRIPTION OF THE DRAWINGS

Several embodiments of the invention will be described in the following by way of example and with reference to the accompanying drawings in which:

FIG. 5 illustrates a cross section of the partly machined injection mold according to the embodiment of the method of FIG. 1;

FIG. 6 illustrates a cross section of the product and the fully machined injection mold according to the embodiment of the method of FIG. 1;

FIG. 8 illustrates a cross section of a portion of the lower half of the injection mold according to the embodiment of the method of FIG. 7;

FIG. 9 illustrates a cross section of a portion of the upper half of the injection mold according to the embodiment of the method of FIG. 7; and FIG. 10 illustrates a cross section of the completed lower half of the injection mold according to the embodiment of the method of FIG. 7.

DETAILED DESCRIPTION

The present invention is directed to a system and method for producing an injection mold and subsequently drilling the injection mold without the need for any gripping devices. Specifically, the exemplary system and method according to the invention is directed to building a mold block layer-by-layer using a depositing technique known in the art. While depositing the layers, the feeder duct formed as an elongated opening is provided in each layer. Once the mold block is complete, a material injected into the mold will also flow into the feeder duct to form an elongated sprue extending from the molded product to a base of the system, thus holding the product in position while millig is performed. Once the molded product has been milled to required specifications, the sprue is removed therefrom to free the product from the base.

Figure 1:
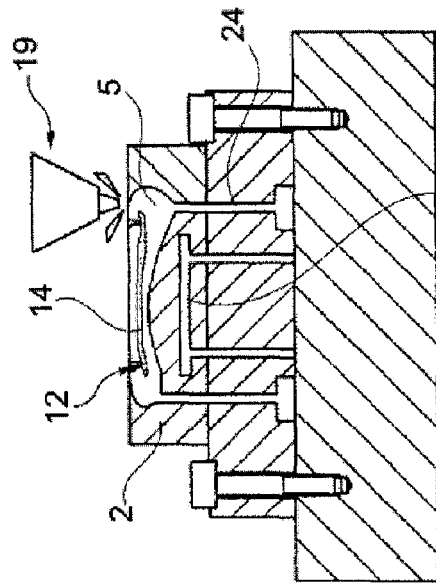
FIG. 1 illustrates a first cross-sectional view of a portion of an injection mold manufactured according to an exemplary embodiment of the method according to the present invention.
Figure 2:
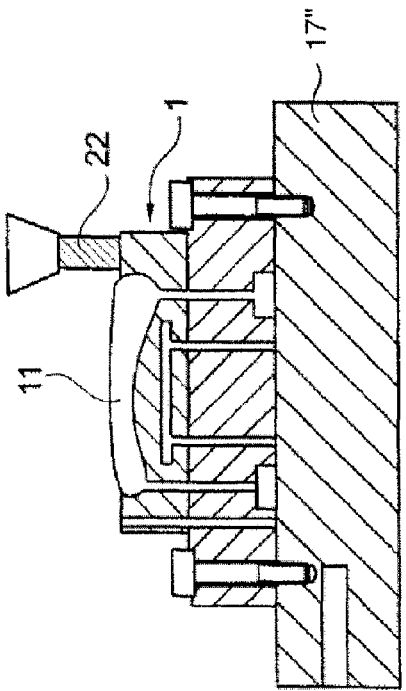
FIG. 2 illustrates a second cross-sectional view of the injection mold of FIG. 1.

FIGS. 1 to 6 illustrate a first exemplary embodiment of a method for manufacturing an injection molded product 11 using an injection mold system 1. The injection mold system 1 comprises a mold block 2 including a mold cavity 5 built on a base plate 9 such that a portion of the injection molded product 11 remains fixed to the base plate 9 while the product 11 is further processed and/or machined. As shown in FIGS. 1 and 2, the mold block 2 of the injection mold system 1 may be built on the base plate 9 using an additive laser manufacturing process, which builds the mold block 2 by depositing a laser melted metallic powder thereon, layer by layer, using a laser additive device 18. For example, a known device for direct additive laser manufacturing is available from IREPA LASER, France. It will be understood by those of skill in the art, however, that any known laser additive device may be used with the system 1. The base plate 9 acts as an interface between the mold block 2 and various machines and/or devices used during an injection molding process, connecting the base plate 9 to a machine interface plate 17 of devices such as, for example, the laser additive device 18, an injection molding device 21 and/or a machining device (e.g., a milling cutter 23).

Figure 3:
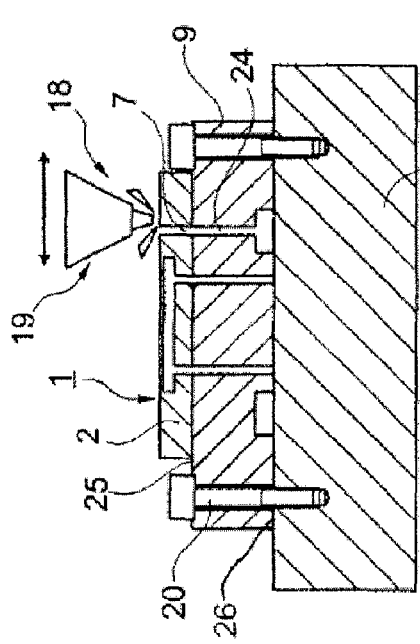
FIG. 3 illustrates a cross section of an injection mold according to the embodiment of the method of FIG. 1.

As illustrated in FIG. 1, the base plate 9 is removably fixed to a machine interface plate 17 of the laser manufacturing apparatus 18 using fixation elements such as, for example, screws 20. The base plate 9 includes a first surface 25 on which the mold block 2 is built and a second surface 26 attached to the machine interface plate 17. The base plate 9 includes inflow channels 24 extending therethrough from the first surface 25 to the second surface 26 so that mold material may flow therethrough to the mold block 2. The base plate 9 also includes coolant ducts 28 extending through at least a portion thereof such that a cooling liquid may flow between the base plate 9 and the mold block 2. The base plate 9 may further include an air and material outlet 29 extending therethrough. As shown in FIGS. 1-3, metallic powder is injected via one or more nozzles and melted under a high-power laser unit 19 resulting in a homogenous deposition of the metallic material. The mold block 2 is built to include feeder ducts 7 for supplying molten material to the mold cavity 5, a duct the for air and material outlet 6, as shown in FIG. 3, from the mold cavity 5 and coolant ducts 8 for a cooling liquid during cooling of the injected molten material. In a preferred embodiment, the mold block 2 includes two feeder ducts 7. The feeder ducts 7 may be produced in communication with the inflow channels 24, the coolant ducts 8 in communication with the coolant ducts 28 and the air and materials outlet 6 in communication with the channel 29 of the base plate 9 so that the mold block 2 does not require any subsequent processing. To produce one layer, the nozzles and the high-power laser unit 19 are moved together along a path covering the complete area of the layer. Thus, the metallic material is deposited on a surface corresponding to a cross-section of the respective layer only so that no material is deposited in the range of the mold cavity 5, the feeder ducts 7, the duct for air and material outlet 6 and the coolant ducts 8.

The diameters of the feeder ducts 7 are sufficiently large so that sprues 15, as shown in FIG. 5, formed by the solidified cast material of the molded product 11 firmly hold the molded product 11 to the base plate 9 and the machine interface plate 17 during subsequent machining. The feeder ducts 7 can be distributed over the cross-sectional area of the mold cavity 5 in such a way that the injection-molded product 11 is held in a mechanically stable manner via the sprues 15. The inflow channels 24 may have an enlarged cross-section 27 at the second surface 26 of the base plate 9 so that the sprues 15 formed by the solidified cast material are held in the base plate 9 in a form-fitting manner.

As illustrated in FIG. 2 a metal structure 14 and two metallic inserts 12 may be inserted into the mold cavity 5 of the injection mold system 1 during manufacturing to provide support to the molded product 11. The metallic inserts 12 may be used to machine threads subsequently therethrough and into the molded product 11.

Once the mold block 2 has been built, the injection mold system 1 may be mounted on an injection-molding machine 21, as shown in FIG. 3. The base plate 9 together with the attached mold block 2 are removably fixed to a machine interface plate 17' of the injection molding machine 21. The base plate 9 may be attached to the injection-molding machine 21 in a manner similar to the laser additive apparatus 18, as described above. For example, the base plate 9 may be attached to the injection-molding machine 21 via screws 20. A molten material 10, e.g. polyether ether ketone (PEEK), a reinforced plastic or an injectable metal alloy is injected into the injection mold system 1 through the inflow channels 24 and the corresponding feeder ducts 7 and into the mold cavity 5. The molten material 10 is inserted therein until the mold cavity 5 is completely filled, surrounding the metal structure 14 and the inserts 12, and so that a portion of the molten material 10 extends into the duct for air and material outlet 6. After the injection step has been completed a cooling liquid is pumped through the coolant ducts 8 so that the injected molten material 10 is cooled off and the product 11 is formed.

Figure 4:
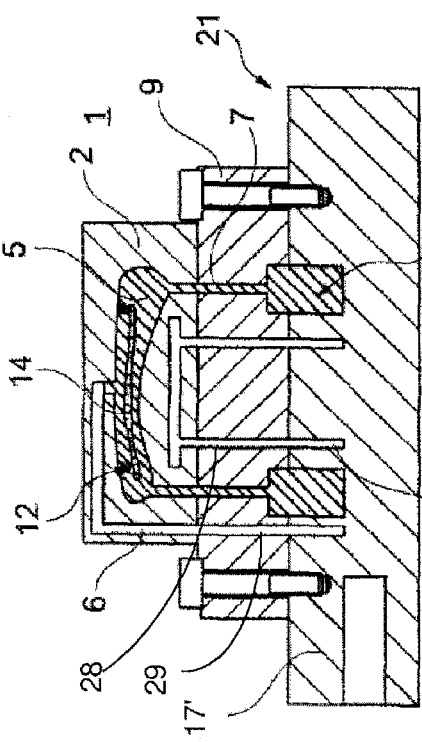
FIG. 4 illustrates a cross section of the injection mold partly machined according to the embodiment of the method of FIG. 1.

FIG. 4 illustrates the step of machining the mold block 2 of the injection mold system 1 after cooling of the product 11. Using, for example, a milling cutter 22, a portion of the mold block 2 is removed to completely expose the product 11. The base plate 9 of the injection mold system 1 may be mounted on a machine interface plate 17" of a milling machine 22.

FIG. 5 illustrates the step of machining the product 11. The machining of the molded product 11 may be performed on the same milling machine used during the previous step where the mold block 2 was machined. The machining of the product 11 includes the cutting of threads into the metallic inserts 12. A milling tool 23 may be used to produce a smooth surface on the whole product 11. During machining, the product 11 is firmly held in the remaining part of the mold block 2 and/or the base plate 9 by the two integrally formed cast sprues 15 which extend from the molded product within the feeder ducts 7. The cast sprues 15 may further extend into the enlarged end of the inflow channel 24 such that the molded product 11 is held firmly relative to the base plate 9. It will be understood by those of skill in the art that the sprues 15 permit the molded product 11 to be fixed relative to the injection mold system 1 such that the molded product 11 may be further processed and/or machined without the use of additional gripping and/or fixation devices.

Once the molded product 11 has been machined as desired, the molded product 11 may be detached from the cast sprues 15 such that only the molded product 11 remains. As shown in FIG. 6, the finished product 11 may be cut from the two sprues 15 using a cutting tool.

As shown in FIGS. 7 to 10, a second exemplary embodiment of an injection mold system 1' is substantially similar to the injection mold system 1, as described above, but uses a selective laser melting process. The injection mold 1', however, comprises a two part mold 13' including a lower part 3' and an upper part 4' which together form a mold cavity 5'. Similar to the injection mold system 1, the two-part mold 13' is built on a base plate 9' removably fixed to a machine interface plate of a processing and/or machining device. As illustrated in FIG. 8 the lower part 3' of the injection mold 1' is built up layer by layer, forming a first portion of the mold cavity 5' along with the feeder ducts 7' and the cooler ducts 8, by first scattering a metallic powder over the complete surface of the lower part 3' to be produced. The metallic powder is deposited within a casing mounted on a machine interface plate of e.g. of a NC-machine (Numerical Control Machine). A scraper is then pulled over the deposited metallic powder so that a layer of the metallic powder with the required thickness for further processing is produced. The metallic powder is then melted in the layer at the boundary of the mold cavity 5', the feeder ducts 7' and the coolant ducts 8'. The molten powder is fused into a solid structure limiting the mold cavity 5', feeder ducts 7' and coolant ducts 8'. The machine table is then lowered by a distance corresponding to a thickness of a layer such that an additional layer of metallic powder may be applied in the casing. These steps are repeated until the lower part 3' of the injection mold 1' is completed.

A supporting structure may be produced in the metallic powder material during production of the lower part 3' of the injection mold 1'. Once the lower part 3' of the injection mold 1' has been completed, the powder remaining in the mold cavity 5', feeder ducts 7' and coolant ducts 8' is dumped. The finished lower part 3 of the injection mold 1' is illustrated in FIG. 10. The upper part 4', as shown in FIG. 9, may be built up using a method similar to the building of the lower part 3' of the injection mold 1'. For example, a casing corresponding to a shape of the upper part 4', including a second portion of the mold cavity 5', is filled with a metallic powder that is melted and reapplied layer by layer fusing the molten powder into a solid structure limiting the mold cavity 5' and the ducts for air and material outlet 6'. When the upper part 4' the injection mold 1' have been completed, the powder remaining in the ducts for air and material outlet 6' is dumped.

Figure 7:
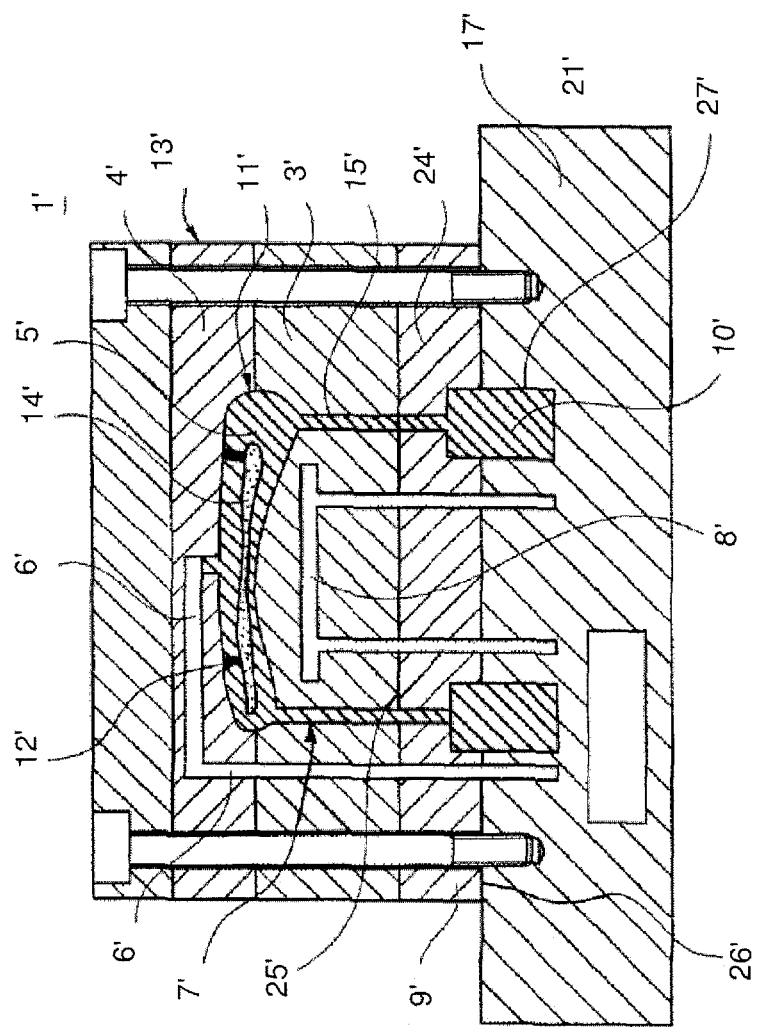
FIG. 7 illustrates a cross section of a two-part injection mold manufactured according to another exemplary embodiment of the method according to the present invention.

As illustrated in FIG. 7, the lower and upper parts 3', 4' are built on the base portion 9' so the lower and upper parts 3', 4' together form the mold cavity 5'. The lower part 3' may be positioned on the base plate 9' such that the first portion of the mold cavity 5' is open in a direction away from the base plate 9'. The upper part 4' may then be placed in a corresponding position such that the second portion of the mold cavity 5' faces the first portion of the mold cavity 5' and is aligned therewith. Similarly to the injection mold system 1, a metal structure 14' and two metallic inserts 12' may be inserted into the injection mold 1' before the lower and upper parts 3', 4; of the injection mold system 1' are fixed closed. The metal structure 14 is used to support a product 11' and the metallic inserts 12' into which threads can be subsequently machined. The base plate 9', along with the two-part mold 13' built thereon, is removably attached to a machine interface plate 17' of an injection molding machine 21. As described above in regard to the injection mold system 1, feeder ducts 7' for supplying the molten material to the mold cavity 5', a duct for air and material outlet 6' from the mold cavity 5' and coolant ducts 8' for a cooling liquid during cooling off the injected molten material are produced in communication with respective channels in the base plate 9' so that the injection mold 1' requires no subsequent processing. Additionally, the diameters of the feeder ducts 7' may be made sufficiently large so that sprues 15' are formed by the solidified cast material which firmly hold the molded product 11' to the injection mold system 1' during subsequent machining.

The injection mold system 1' may be used in a substantially similar manner to that described above in regard to the injection mold system 1'. As shown in FIG. 7, a molten material, e.g. polyether ether ketone (PEEK), a reinforced plastic or an injectable metal alloy is injected into the injection mold 1' through the two feeder ducts 7' and into the mold cavity 5'. The mold cavity 5' is completely filled with the molten material with a portion thereof extending into the duct for air and material outlet 6'. After the injection step has been completed a cooling liquid is pumped through the coolant ducts 8' so that the injected molten material is cooled off and the product 11' is formed.

After cooling off the injected molten material and forming the product 11', the upper part 4' of the injection mold 1' is removed. Subsequently, the lower part 3' of the injection mold 3' is machined away or milled using, for example, a milling cutter. A portion of the lower part 3' of the injection mold 1' is removed to completely expose the product 11'. The lower part 3' of the injection mold 1', which is still fixed to the base plate 9' may be mounted on e.g., a machine interface plate 17 of a milling machine.

Similar to the first embodiment illustrated in FIGS. 1 to 6, the step of machining the product 11' can be performed on the same milling machine as used during the previous step where the lower part 3' of the injection mold 1' was machined. The machining of the product 11' includes the cutting of threads into the metallic inserts 12' and producing a smooth surface on the whole product 11' using, for example, a milling tool. During machining, the product 11' is firmly held in the remaining part of the lower part 3' of the two part mold 13' via integrally cast sprues 15' which extend from the product 11' within the feeder ducts 7'. After the product 11' has been machined as desired, the product 11' may be cut from the sprues 15' so that only the finished product 11' remains.

Although the invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, composition of matter, means, methods, or steps, presently existing or later to be developed that perform substantially the same function or achieve substantially the same result as the corresponding embodiments described herein may be utilized according to the present invention.

It will be appreciated by those skilled in the art that various modifications and alterations of the invention can be made without departing from the broad scope of the appended claims. Some of these have been discussed above and others will be apparent to those skilled in the art.

What is claimed is:

1. A method for manufacturing an injection molded product, comprising:
    producing an injection mold by building a one-piece mold block including a mold cavity sized and shaped to correspond to a desired shape of the injection molded product and a first feeder duct extending from the mold cavity to a base plate;
    injecting a molten material into the mold cavity via the first feeder duct to form an injection molded product and a sprue extending therefrom into the first feeder duct, the sprue holding the molded product to the base plate;
    machining a portion of the injection mold to expose the injection molded product;
    machining the injection molded product while the sprue firmly holds the product in a remaining portion of the injection mold; and
    cutting the injection molded product from the sprue.

2. The method according to claim 1, wherein the machining of the injection molded product includes smoothing an outer surface of the product.

3. The method according to claim 1, wherein the mold block is fixedly built up on the base plate.

4. The method according to claim 3, wherein the mold block includes a second feeder duct.

5. The method according to claim 4, wherein the base plate comprises a first surface adjacent to the mold block, a second surface facing away from the mold block and an inflow channel in fluid communication with the first feeder duct, the inflow channel having an enlarged portion toward the second surface of the base plate.

6. The method according to claim 1, wherein the mold block is formed by depositing a laser melted metallic powder layer by layer.

7. The method according to claim 1, wherein a metallic structure is inserted into the mold cavity during production of the mold block to provide support to the injection molded product.

8. The method according to claim 1, wherein a metallic insert is inserted into the mold cavity during production of the mold block such that a threading is machinable through the insert into the injection molded product.

9. The method according to claim 1, wherein the machining of the product includes one of a milling of the product and a cutting of threads into the product.

10. The method according to claim 1, wherein producing the injection mold includes producing one of an air and material outlet and a coolant duct.

* * * * *